(12) United States Patent
Sangaru et al.

(10) Patent No.: US 11,499,085 B1
(45) Date of Patent: Nov. 15, 2022

(54) COMPOSITION AND METHOD FOR CONTROLLING LOST CIRCULATION

(71) Applicants: Shiv Shankar Sangaru, Qurtubah (SA); Pranjal Sarmah, Qurtubah (SA)

(72) Inventors: Shiv Shankar Sangaru, Qurtubah (SA); Pranjal Sarmah, Qurtubah (SA)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/536,554

(22) Filed: Nov. 29, 2021

(51) Int. Cl.
*C09K 8/502* (2006.01)
*C09K 8/26* (2006.01)
*E21B 21/00* (2006.01)
*E21B 33/138* (2006.01)

(52) U.S. Cl.
CPC .............. *C09K 8/502* (2013.01); *C09K 8/265* (2013.01); *E21B 21/003* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 3,887,009 A * | 6/1975 | Miller | C04B 28/30 166/292 |
| 9,695,351 B2 | 7/2017 | Yadav et al. | |
| 9,708,869 B2 | 7/2017 | Sarmah et al. | |
| 9,828,293 B2 | 11/2017 | Yadav et al. | |
| 10,138,165 B2 | 11/2018 | Sarmah et al. | |
| 2016/0225861 A1 * | 8/2016 | Cheng | H01L 21/02381 |
| 2019/0225861 A1 * | 7/2019 | Reddy | C04B 9/02 |
| 2020/0001206 A1 * | 1/2020 | May | C09K 8/10 |

FOREIGN PATENT DOCUMENTS

CA 2175144 A * 10/1997 ........... E21B 33/138
WO WO-2018093374 A1 * 5/2018

OTHER PUBLICATIONS

Addagalla, A., et al. "A Novel Phase Transition Loss Circulation Solution for Severe Losses Scenario: Case Histories from Middle East and Africa" SPE-202234-MS, 2020, 9 pages.
Mata, F., et al. "CrossLinked Cements Solve Lost Circulation Problems", SPE 90496, 2004, 5 pages.
Sweatman, R., et al. "Acid-Soluble Magnesia Cement: New Applications in Completion and Workover Operations", SPE 18031, 1990, 16 pages.
Vadav, P., et al. "New Phase Transformation Fluid Based Loss Circulation Material: Hi-Strength, Year Round Use to Cure Severe to Total Loss in Reservoir and Non-Resevoir Sections", SPE-1834945-MS, 2017, 11 pages.

* cited by examiner

Primary Examiner — Charles R Nold
(74) Attorney, Agent, or Firm — Cantor Colburn LLP

(57) ABSTRACT

A method of controlling lost circulation includes introducing into a wellbore a lost circulation fluid comprising: an external oil phase, an internal aqueous phase, an emulsifier, a wetting agent, a magnesia sealant, and a; retarder; contacting the lost circulation fluid with a lost circulation zone; and forming a plug adjacent the lost circulation zone by reacting the magnesia sealant with water at a wellbore temperature, thereby reducing fluid loss into the lost circulation zone.

19 Claims, 4 Drawing Sheets

COMPOSITION AND METHOD FOR CONTROLLING LOST CIRCULATION

BACKGROUND

Lost circulation is the loss of drilling fluids, drill-in fluids, or cementing compositions from the wellbore into the formation. Lost circulation may be encountered in any aspect of operation i.e., during drilling, circulation, tripping or cementing, and can result in increased cost of the well through increased material costs to replace lost fluids and downtime to remediate the lost circulation zone. Uncontrolled lost circulation may also result in a dangerous pressure control situation and ultimately lead to loss of the well.

The problem is normally addressed through the application of lost circulation materials such as calcium carbonate, mica, salt pills, fibrous material, flaky material, polymer based gels, or cement, which may seal off lost circulation zones to prevent further fluid loss. However, despite all the advances, there is still a continuing need for alternative lost circulation compositions and methods to mitigate lost circulation, especially, in high temperature wells.

BRIEF DESCRIPTION

A method of controlling lost circulation includes introducing into a wellbore a lost circulation fluid comprising: an external oil phase, an internal aqueous phase, an emulsifier, a wetting agent, a magnesia sealant, and a retarder; contacting the lost circulation fluid with a lost circulation zone; and forming a plug adjacent the lost circulation zone by reacting the magnesia sealant with water at a wellbore temperature, thereby reducing fluid loss into the lost circulation zone.

A lost circulation fluid includes: an external oil phase, an internal aqueous phase, an emulsifier, a wetting agent, a magnesia sealant comprising magnesia, magnesium sulfate, and dolomite, and a retarder, wherein the lost circulation fluid is an invert emulsion, and the external oil phase is a continuous phase.

BRIEF DESCRIPTION OF THE DRAWINGS

The following description should not be considered limiting in any way. With reference to the accompanying drawings, like elements are numbered alike.

DETAILED DESCRIPTION

Figure 1:
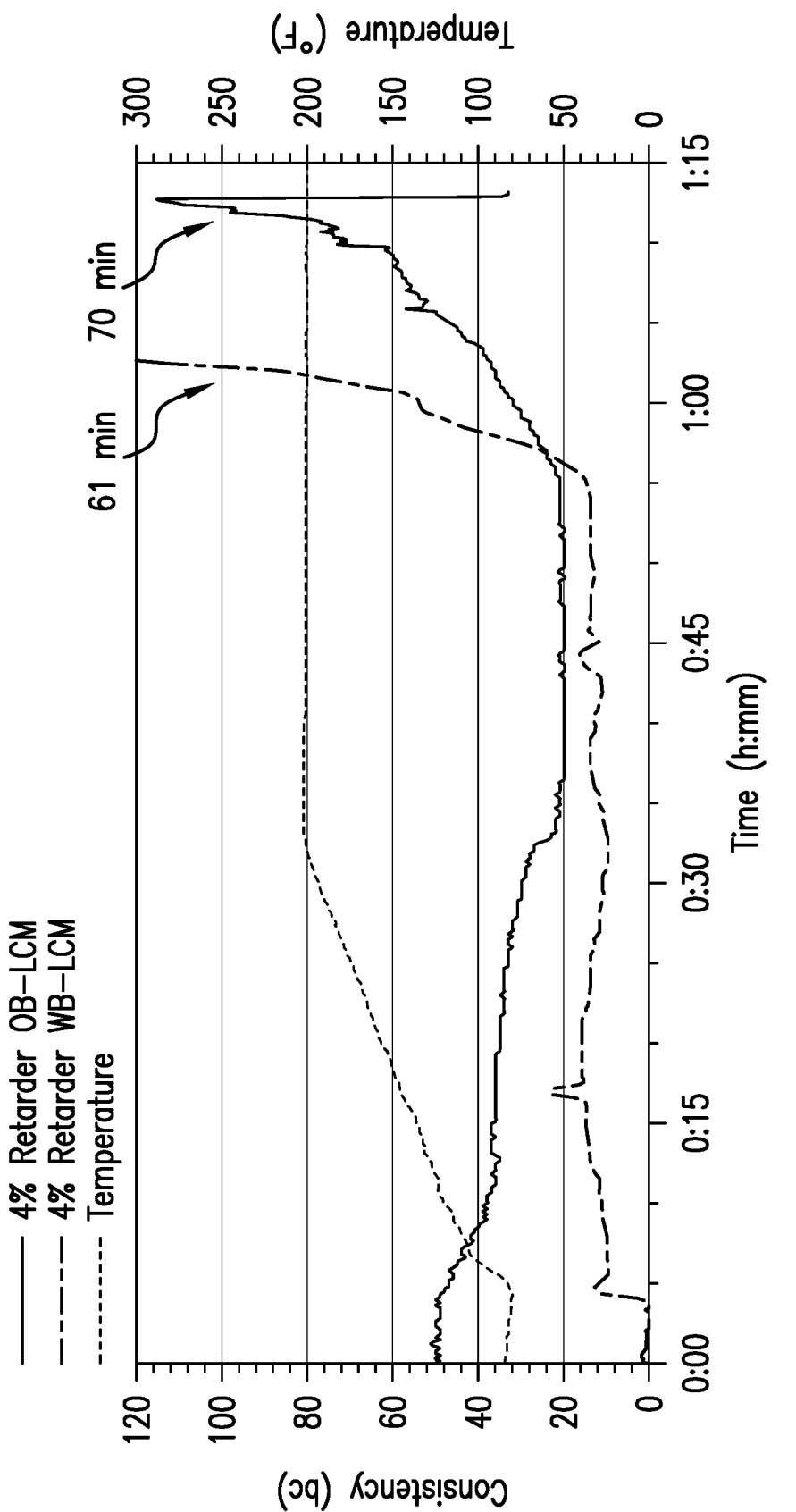
FIG. 1 is a graph of consistency (Bearden units of consistency, bc) versus time (hour:minute, h:mm) for oil-based lost circulation fluid OB-LCM1 and water-based lost circulation fluid WB-LCM1 measured at 200° F.

The inventors have discovered an oil-based lost circulation fluid having a controlled setting time at a wide temperature range. In particular, the oil-based lost circulation fluid can have a delayed setting time even at a high temperature such as a temperature of greater than or equal to about 200° F., allowing for adequate pumping time and proper placement of the lost circulation fluid at its desired location. The oil-based lost circulation fluid can be used to mitigate lost circulation in wells including, but are not limited to, high temperature wells.

The sealant in the oil-based lost circulation fluid can react with water and form a hard set plug adjacent the lost circulation zone, thereby reducing fluid loss into the lost circulation zone. In addition, the set plug is acid soluble, thus it can be easily removed when no longer needed. Due to better delay times achieved with the oil-based circulation fluid at high temperatures as opposed to a water-based lost circulation fluid, the oil-based lost circulation fluid disclosed herein can be used under high temperature well conditions.

The oil-based circulation fluid can be an invert emulsion. Invert emulsion is a complex heterogeneous fluid, and could be described as a polar fluid emulsified as the internal phase with a non-polar fluid as the continuous phase.

The oil-based lost circulation fluid comprises an external oil phase, an internal aqueous phase, an emulsifier, a wetting agent, a magnesia sealant, and a retarder. The external oil phase is a continuous phase, and the internal aqueous phase is a discontinuous phase.

The external oil phase of the oil-based lost circulation fluid may comprise any oil including, but not limited to, a diesel oil, kerosene oil, mineral oil, fuel oil, crude oil, paraffin oil, vegetable oil such as soybean oil and palm oil, gas oil, synthetic oil such as polyolefins (e.g., alpha-olefins and/or internal olefins), polydiorganosiloxanes, esters, diesters of carbonic acid, aliphatic solvents, aromatic solvents, or a combination comprising at least one of the foregoing. The external oil phase can be present in an amount of about 20 volume percent to about 80 volume percent, preferably about 30 volume percent to about 70 volume percent, more preferably about 40 volume percent to about 60 volume percent, each based on the total volume of the liquid constituents of the oil-based lost circulation fluid. In other terms, the fluid can have an oil water (or sea water or brine) volume ratio ranging from about 20:80 to about 80:20, about 30:70 to about 70:30 or about 40:60 to about 60:40.

The internal aqueous phase of the oil-based lost circulation fluid contains water, seawater, or a brine. The brine can include a salt such as alkali halides, alkaline earth halides, alkali nitrates, alkaline earth nitrates, alkali formates, alkali acetate, alkali phosphates, zinc halides, rare earth halides, or rare earth nitrates. Exemplary salts include sodium chloride, sodium bromide, potassium chloride, potassium bromide, calcium chloride, sodium formate, potassium formate, sodium acetate, potassium acetate, sodium phosphate, or potassium phosphate. Combinations of the salts can be used. The amount of the salts in the internal phase is up to the respective saturation limits of the salts. The saturation limits of salts can range from about 10 wt % to about 50 wt. %, based on the total weight of the internal phase. The internal aqueous phase of the lost circulation control fluid can be solid free or contains less than about 20 weight percent, less than about 15 weight percent, or less than 10 weight percent of solids based on a total weight of the internal aqueous phase.

The suitable amount of the internal aqueous phases in the lost circulation fluid can be adjusted based on the formation conditions. In an embodiment, the internal aqueous phase is present in an amount of about 80 volume percent to about 20 volume percent, preferably about 70 volume percent to about 30 volume percent, more preferably about 60 volume percent to about 40 volume percent, based on the total volume of the liquid constituents of the oil-based lost circulation fluid. In other terms, the fluid can have an oil to water or sea water or brine volume ratio ranging from about 20:80 to about 80:20, about 30:70 to about 70:30, or about 40:60 to about 60:40.

The oil-based lost circulation fluid also includes an emulsifier. The emulsifier can include various fatty acid and/or derivatives thereof, clay, polymers such as polyamides, or a combination comprising at least one of the foregoing. Exemplary fatty acid derivatives include fatty acid soaps, such as the calcium soaps, which can be prepared by reacting a fatty acid with lime The emulsifier can be present in an amount of about 0.1 weight percent to about 10 weight percent, preferably about 0.3 weight percent to about 5 weight percent, and more preferably about 0.5 weight percent to about 2 weight percent, each based on total weight of the oil-based lost circulation fluid.

The magnesia sealant in the oil-based lost circulation fluid comprises magnesia, magnesium sulfate, and dolomite. Magnesia is also known as magnesium oxide. Dolomite is an anhydrous carbonate material composed of calcium magnesium carbonate having the chemical formula $CaMg(CO_3)_2$. The magnesia sealant can include about 10 to about 70 weight percent, preferably about 30 weight percent to about 40 weight percent of magnesia, about 10 weight percent to about 60 weight percent, preferably about 20 weight percent to about 30 weight percent of magnesium sulfate, and about 5 to about 75 weight percent, preferably about 30 to about 45 weight percent of dolomite, each based on a total weigh of the magnesia sealant.

The magnesia sealant can be present in a powder form. In an embodiment, greater than 80 weight percent, greater than about 85 weight percent, greater than about 90 weight percent, greater than about 95 weight percent, greater than about 98 weight percent, or 100 weight percent of the magnesia sealant is suspended in the externa oil phase, each based on a total weigh of the magnesia sealant.

The oil-based lost circulation fluid can contain about 20 weight percent to about 80 weight percent, preferably about 30 weight percent to about 70 weight percent, more preferably about 40 weight percent to about 60 weight percent of the magnesia sealant based on the total weight of the oil-based lost circulation fluid.

The oil-based lost circulation fluid also includes a retarder to delay the setting time of the lost circulation fluid. The retarder in the oil-based lost circulation fluid includes, but is not necessarily limited to, sodium borate, boric acid, disodium tetraborate decahydrate, or a combination comprising at least one of the foregoing. Suitable proportions for the retarder to be used in the fluid range from about 0.1 weight percent to about 50 weight percent, preferably about 1 weight percent to about 20 weight percent, each with respect to the total weight of the magnesia sealant in the oil-based lost circulation fluid.

The oil-based lost circulation fluid also includes a wetting agent that promotes dispersion of the solid particles, like that of magnesia sealant, into the oil phase of the invert emulsion. The wetting agent can include crude tall oil, oxidized crude tall oil, surfactants, organic phosphate esters, imidazolines and modified amidoamines, alkyl aromatic sulphonates, alkyl aromatic sulfates, and the like, and combinations or derivatives thereof. Preferably, the wetting agent includes an alkyl aromatic sulphonate.

The wetting agent can be present in an amount of about 0.01 weight percent to about 5 weight percent, preferably about 0.02 weight percent to about 3 weight percent, and more preferably about 0.05 weight percent to about 1 weight percent, each based on total weight of the oil-based lost circulation fluid.

Viscoelastic surfactants (also referred to as viscosifiers) that are used in water-based lost circulation fluids are not needed for the oil-based lost circulation fluid disclosed herein. In an embodiment, the oil-based lost circulation fluid does not contain viscoelastic surfactants, for example, the oil-based lost circulation fluid disclosed herein can be free of viscoelastic surfactant described in U.S. Pat. No. 9,828,293.

The density of the oil-based lost circulation fluid can range from about 8.5 pounds per gallon (lb/gal) to about 20 lb/gal, preferably about 10 lb/gal to about 16 lb/gal, and more preferably about 12 lb/gal to about 14 lb/gal.

The magnesia sealant in the oil-based lost circulation fluid can react with water forming a plug with adequate strength to reduce fluid loss. Accordingly, a method of controlling lost circulation comprises introducing into a wellbore the oil-based lost circulation fluid described herein, contacting the lost circulation fluid with a lost circulation zone; and forming a plug adjacent the lost circulation zone by reacting the magnesia sealant with water at a wellbore temperature, thereby reducing fluid loss into the lost circulation zone.

As used herein, the thickening time, which is also referred to as the setting time, means the time to form a plug of sufficient strength. The thickening time depends on the reaction between water and the magnesia sealant at the wellbore temperature. When the wellbore temperature increases, the reaction rate can increase. Increased reaction rate can lead to premature setting. Use of a retarder may help in suppressing the reaction between water and the sealant thus delaying the setting of the lost circulation fluids. However, it can be challenging to achieve a long delay time at a high temperature, for example, at a temperature of above about 200° F. using a retarder in water-based lost circulation fluids. At temperature above 200° F., the effectiveness of the currently used retarders in water-based lost circulation fluids decrease rapidly in providing any significant delayed setting times. Without wishing to be bound by theory, it is believed that forming an invert emulsion provides an additional delay mechanism by separating water in the internal aqueous phase from the magnesia sealant suspended in relatively inaccessible external oil phase. As a result, significantly longer delay times can be achieved with the oil-based lost circulation fluid described herein. For example, the thickening time for the oil-based lost circulation fluid at 200° F. can be from about 1 minutes to about 12 hours, from about 10 minutes to about 11 hours, from about 30 minutes to about 10 hours or from greater than about one hour to about 10 hours. As used herein, the thickening time is determined by monitoring the time required for the oil-based lost circulation fluid's consistency to reach 70 Bearden units of consistency (Bc) measured using a consistometer. Although the oil-based lost circulation fluid has been described herein for its particular advantages when used in high temperature wells, it is appreciated that the oil-based lost circulation fluid described herein can also be used in low temperature wells and medium temperature wells in addition to high temperature wells. The lost circulation fluid can be used in wells having a wellbore temperature of at least 200° F., for example from about 200° F. to about 350° F., from about 240° F. to about 300° F., or from about 250° F. to about 275° F. The lost circulation fluid can also be used in wells having a wellbore temperature below 200° F., for example from about 50° F. to 200° F. or from about 70° F. to about 200° F.

The following is a description of examples of oil-based lost circulation fluids. It is noted that the components of the oil-based lost circulation fluids and the amounts thereof are not limited to the specific examples.

EXAMPLES

Oil based lost circulation fluids (OB-LCM) were prepared by first forming an invert emulsion of an aqueous phase suspended in an oil continuous phase using a emulsifier and a wetting agent using a warring blender at 10000 rpm (revolution per minute). The emulsifier is a polyamide based polymeric additive and the wetting agent used was an alkyl aromatic sulfonate based surfactant. After a stable emulsion was formed, a mixture of a sealant (magnesia, magnesium sulfate, and dolomite) and a retarder (sodium borate) was added to it in the warring blender at 4000 rpm. The emulsion stability, before and after addition of sealant mixture, was checked by drop test method. The invert emulsion slurry formed a separate phase in water indicating that a stable invert emulsion was formed with oil as a continuous phase.

The thickening time for the fluids was measured using HPHT (high pressure high temperature) consistometer by monitoring the time required for the fluids' consistency to reach 70 Bearden units of consistency (Bc).

OB-LCM1 has 4 wt % of the retarder with respect to the total weight of the magnesia sealant in the oil-based lost circulation fluid. In total, OB-LCM1 has 2.2 wt % of the retarder and 55.7 wt % of the sealant, each based on a total weight of the fluid. The thickening time of the OB-LCM1 was measured at 200° F. and also compared with that of a water based fluid (WB-LCM1) containing the same sealant and the same retardant in the same ratio but in absence of oil and emulsifying agents. The thickening time for OB-LCM1 was 70 min whereas it was 61 min for WB-LCM as shown in FIG. 1.

Figure 2:
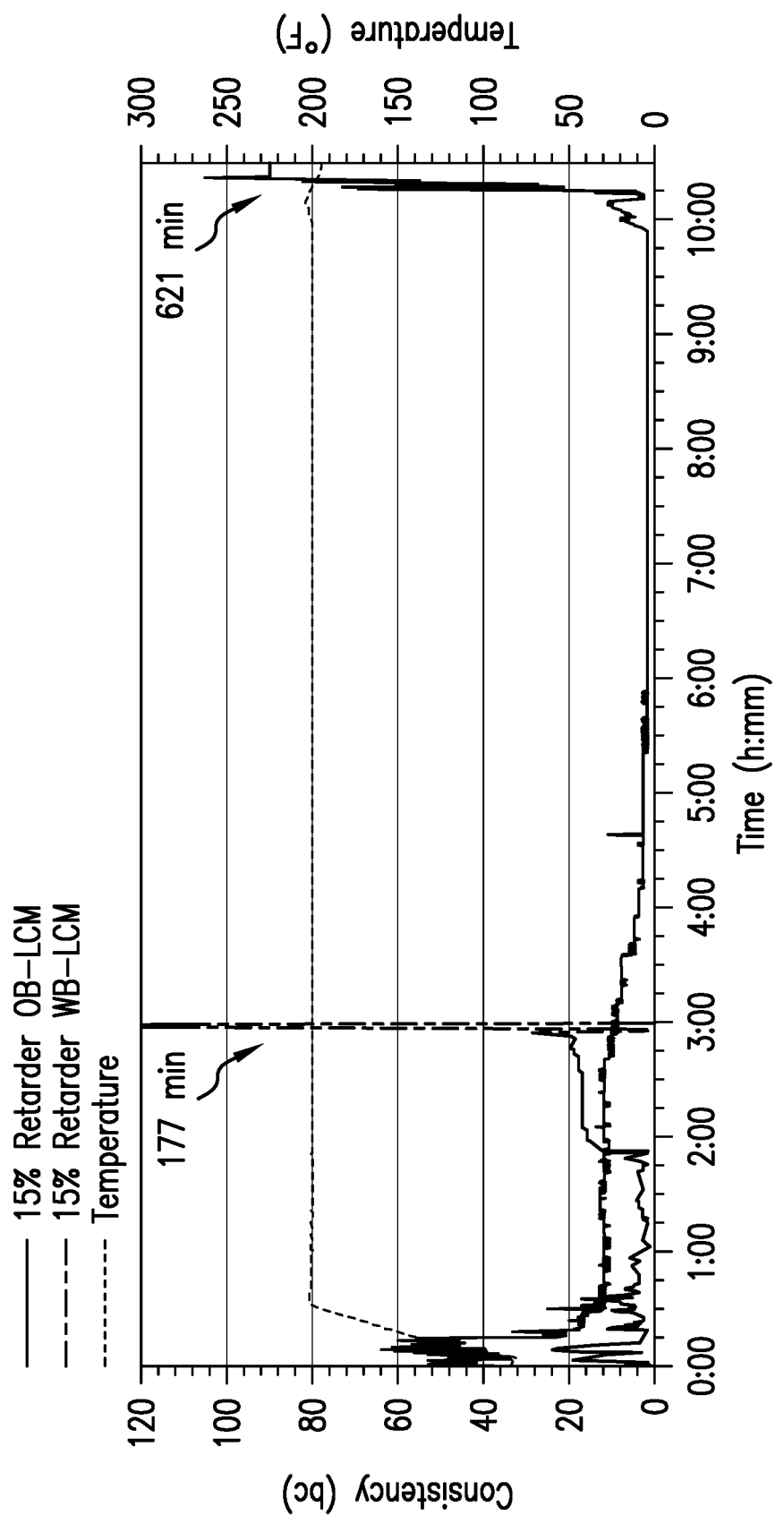
FIG. 2 is a graph of consistency (bc) versus time (hour:minute, h:mm) for oil-based lost circulation fluid OB-LCM2 and water-based lost circulation fluid WB-LCM2 measured at 200° F.

OB-LCM2 has 15 wt % of the retarder with respect to the total weight of the magnesia sealant in the oil-based lost circulation fluid. In total, OB-LCM2 has 7.9 wt % of the retarder and 52.5 wt % of the sealant, each based on a total weight of the fluid. The thickening time for OB-LCM2 was measured at 200° F. and also compared with that of a water based fluid (WB-LCM2) containing the same sealant and the same retardant in the same ratio but in absence of oil and emulsifying agents. The results are shown in FIG. 2. Significant difference in thickening time was observed between OB-LCM2 and WB-LCM2 when the retarder percentage was increased. Thickening time with OB-LCM2 was close to 10 hours as opposed to WB-LCM2 which thickened in nearly 3 hours (FIG. 2). This demonstrates that with oil-based lost circulation fluids, the window for optimizing thickening time is significantly wider as compared to that achievable with water-based lost circulation fluids.

Figure 3:
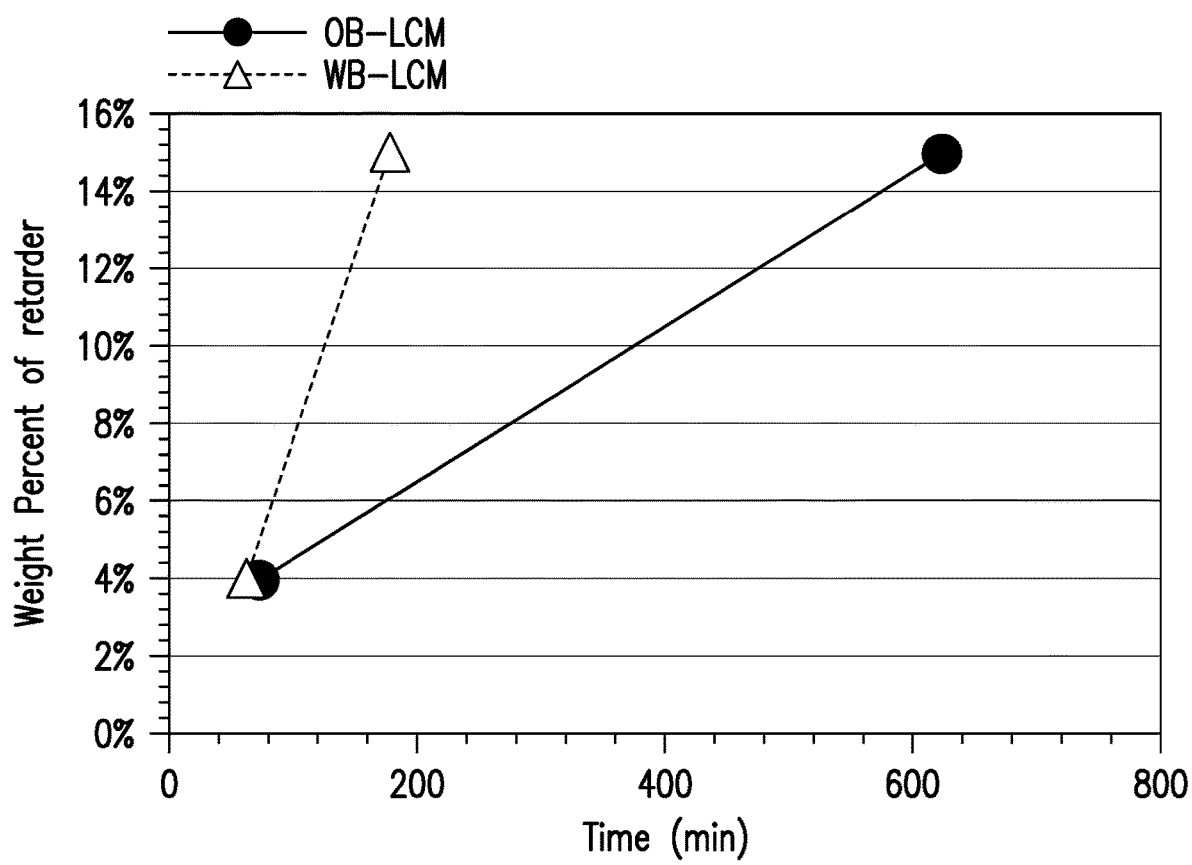
FIG. 3 is a graph of the concentration of added retarder (weight percent, wt %) versus thickening time (minute, min) for oil-based lost circulation fluids and water-based lost circulation fluids at 200° F.

FIG. 3 is a graph of the retarder concentration (weight percent based on the total weight of magnesia sealant in the fluids) versus thickening time (minutes) of oil-based lost circulation fluids and water-based lost circulation fluids. The results show that desirable delay time at elevated temperatures can be difficult to achieve for a water-based lost circulation fluid. Without wishing to be bound by theory, it is believed that the formation of an invert emulsion provides an additional delay mechanism by separating water from the sealant which is suspended in relatively inaccessible oil phase. Accordingly significantly longer delay times can be achieved with oil-based lost circulation fluids as described herein.

Figure 4:
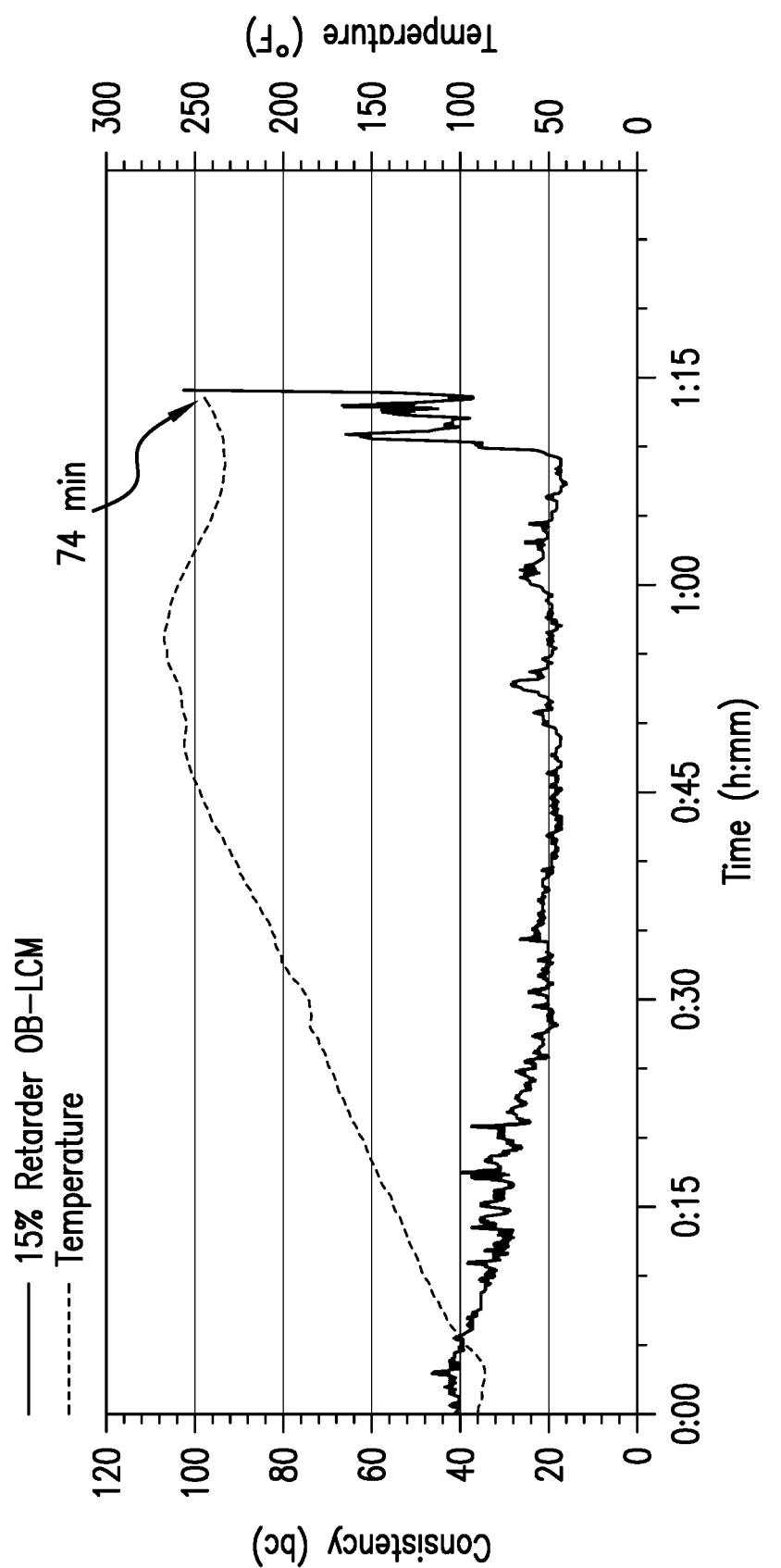
FIG. 4 is graph of consistency (Bearden units of consistency, bc) versus time (hour:minute, h:mm) for oil-based lost circulation fluid OB-LCM3 measured at 250° F.

OB-LCM3 includes 15 wt % of the retarder based on the total weight of the magnesia sealant in the oil-based lost circulation fluid. In total, OB-LCM2 has 7.9 wt % of the retarder and 52.5 wt % of the sealant, each based on the total weight of the fluid. The thickening time of OB-LCM3 was measured at 250° F., and the results are shown in FIG. 4. As shown in FIG. 4, a thickening time of nearly 1 hour and 14 minutes was achieved with the OB-LCM3. This indicates that OB-LCM fluid can be used as a lost circulation fluid even for high temperature wells by maintaining pumpability of the fluid for more than one hour.

Set forth below are various embodiments of the disclosure.

Aspect 1. A method of controlling lost circulation, the method comprising: introducing into a wellbore a lost circulation fluid comprising: an external oil phase, an internal aqueous phase, an emulsifier, a wetting agent, a magnesia sealant, and a; retarder; contacting the lost circulation fluid with a lost circulation zone; and forming a plug adjacent the lost circulation zone by reacting the magnesia sealant with water at a wellbore temperature, thereby reducing fluid loss into the lost circulation zone.

Aspect 2. The method as in any prior aspect, wherein the lost circulation fluid is an invert emulsion, and the external oil phase is a continuous phase.

Aspect 3. The method as in any prior aspect, wherein the magnesia sealant is suspended in the external oil phase.

Aspect 4. The method as in any prior aspect, wherein the magnesia sealant comprises magnesia, magnesium sulfate, and dolomite.

Aspect 5. The method as in any prior aspect, wherein the magnesia sealant is present in an amount of about 20 weight percent to about 80 weight percent based on the total weight of the lost circulation fluid.

Aspect 6. The method as in any prior aspect, wherein the retarder comprises sodium borate, boric acid, disodium tetraborate decahydrate, or a combination comprising at least one of the foregoing.

Aspect 7. The method as in any prior aspect, wherein the retarder is present in an amount of about 0.1 weight percent to about 50 weight percent, with respect to the total weight of the magnesia sealant in the lost circulation fluid.

Aspect 8. The method as in any prior aspect, wherein the oil phase comprises an oil and the internal aqueous phase comprises water, a sea water, or a brine, and a volume ratio of the oil relative to water, the sea water or the brine ranges from 20:80 to 80:20.

Aspect 9. The method as in any prior aspect, wherein the external oil phase comprises a diesel oil, a kerosene oil, a mineral oil, a fuel oil, a crude oil, a paraffin oil, a vegetable oil, a gas oil, a synthetic oil, a polydiorganosiloxane, an ester, a diester of a carbonic acid, an aliphatic solvent, an aromatic solvent, or a combination comprising at least one of the foregoing.

Aspect 10. The method as in any prior aspect, wherein the emulsifier comprises fatty acid or a derivative thereof, clay, a polyamide, or a combination comprising at least one of the foregoing.

Aspect 11. The method as in any prior aspect, wherein the emulsifier is present in an amount of about 0.1 weight percent to about 10 weight percent based on a total weight of the lost circulation fluid.

Aspect 12. The method as in any prior aspect, wherein the wetting agent comprises a crude tall oil, an oxidized crude tall oil, a surfactant, an organic phosphate ester, an imidazolines, a modified amidoamines, an alkyl aromatic sulphonate, an alkyl aromatic sulfate, or a combination comprising at least one of the foregoing.

Aspect 13. The method as in any prior aspect, wherein the wetting agent is present in an amount of about 0.01 weight percent to about 5 weight percent, based on total weight of the lost circulation fluid.

Aspect 14. The method as in a prior aspect, wherein internal aqueous phase comprises water and a salt comprising an alkali halide, an alkaline earth halide, an alkali nitrate, an alkaline earth nitrate, an alkali formate, an alkali acetate, an alkali phosphate, a zinc halide, a rare earth halide, a rare earth nitrate, or a combination thereof.

Aspect 15. The method as in any prior aspect, wherein a customized lost circulation fluid thickens to exceed a consistency of about 70 Bearden units in about 1 minute to about 12 hours at a targeted temperature between 200° F. to 275° F. Although the lost circulation fluid can have a delayed setting time in a high temperature well, the application of the lost circulation fluid is not limited to high temperature wells.

The lost circulation fluid as described herein can be used in wells having a wide wellbore temperature. For example, the lost circulation fluid may be used in wells having a wellbore temperature of at least 200° F., such as from about 200° F. to about 350° F., from about 240° F. to about 300° F., or from about 250° F. to about 275° F. The lost circulation fluid can also be used in wells having a wellbore temperature below 200° F., for example from about 50° F. to 200° F. or from about 70° F. to about 200° F.

Aspect 16. A lost circulation fluid comprising: an external oil phase, an internal aqueous phase, an emulsifier, a wetting agent, a magnesia sealant comprising magnesia, magnesium sulfate, and dolomite, and a retarder, wherein the lost circulation fluid is an invert emulsion, and the external oil phase is a continuous phase.

Aspect 17. The lost circulation fluid as in any prior aspect, wherein the magnesia sealant is suspended in the external oil phase.

Aspect 18. The lost circulation fluid as in any prior aspect, wherein the retarder comprises sodium borate, boric acid, disodium tetraborate decahydrate, or a combination comprising at least one of the foregoing; and the retarder is present in an amount of about 0.1 weight percent to about 50 weight percent, with respect to the total weight of the magnesia sealant in the lost circulation fluid.

Aspect 19. The lost circulation fluid as in any prior aspect, wherein the emulsifier is present in an amount of about 0.1 weight percent to about 10 weight percent, the wetting agent is present in an amount of about 0.01 weight percent to about 5 weight percent, the magnesia sealant is present in amount of about 20 weight percent to about 80 weight percent, each based on a total weight of the lost circulation fluid, and wherein the oil phase comprises an oil and the internal aqueous phase comprises water, a sea water, or a brine, and a volume ratio of the oil relative to water or the sea water or the brine ranges from about 20:80 to about 80:20.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of controlling lost circulation, the method comprising:
   introducing into a wellbore a lost circulation fluid comprising:
      an external oil phase,
      an internal aqueous phase,
      an emulsifier,
      a wetting agent,
      a magnesia sealant, and
      a retarder;
   contacting the lost circulation fluid with a lost circulation zone; and
   forming a plug adjacent the lost circulation zone by reacting the magnesia sealant with water at a wellbore temperature, thereby reducing fluid loss into the lost circulation zone.

2. The method of claim 1, wherein the lost circulation fluid is an invert emulsion, and the external oil phase is a continuous phase.

3. The method of claim 1, wherein the magnesia sealant is suspended in the external oil phase.

4. The method of claim 1, wherein the magnesia sealant comprises magnesia, magnesium sulfate, and dolomite.

5. The method of claim 1, wherein the magnesia sealant is present in an amount of about 20 weight percent to about 80 weight percent based on the total weight of the lost circulation fluid.

6. The method of claim 1, wherein the retarder comprises sodium borate, boric acid, disodium tetraborate decahydrate, or a combination comprising at least one of the foregoing.

7. The method of claim 1, wherein the retarder is present in an amount of about 0.1 weight percent to about 50 weight percent, with respect to the total weight of the magnesia sealant in the lost circulation fluid.

8. The method of claim 1, wherein the oil phase comprises an oil and the internal aqueous phase comprises water, a sea water or a brine, and a volume ratio of the oil relative to water, the sea water, or the brine ranges from 20:80 to 80:20.

9. The method of claim 1, wherein the external oil phase comprises a diesel oil, a kerosene oil, a mineral oil, a fuel oil, a crude oil, a paraffin oil, a vegetable oil, a gas oil, a synthetic oil, a polydiorganosiloxane, an ester, a diester of a carbonic acid, an aliphatic solvent, an aromatic solvent, or a combination comprising at least one of the foregoing.

10. The method of claim 1, wherein the emulsifier comprises a fatty acid or a derivative thereof, clay, a polyamide, or a combination comprising at least one of the foregoing.

11. The method of claim 1, wherein the emulsifier is present in an amount of about 0.1 weight percent to about 10 weight percent based on a total weight of the lost circulation fluid.

12. The method of claim 1, wherein the wetting agent comprises a crude tall oil, an oxidized crude tall oil, a surfactant, an organic phosphate ester, an imidazolines, a modified amidoamines, an alkyl aromatic sulphonate, an alkyl aromatic sulfate, or a combination comprising at least one of the foregoing.

13. The method of claim 1, wherein the wetting agent is present in an amount of about 0.01 weight percent to about 5 weight percent, based on total weight of the lost circulation fluid.

14. The method of claim 1, wherein internal aqueous phase comprises water and a salt comprising an alkali halide, an alkaline earth halide, an alkali nitrate, an alkaline earth nitrate, an alkali formate, an alkali acetate, an alkali phosphate, a zinc halide, a rare earth halide, a rare earth nitrate, or a combination thereof.

15. The method of claim 1, wherein the lost circulation fluid thickens to exceed a consistency of about 70 Bearden units in about 1 minute to about 12 hours at a targeted temperature between 200° F. to 275° F.

16. A lost circulation fluid comprising:
an external oil phase,
an internal aqueous phase,
an emulsifier,
a wetting agent,
a magnesia sealant comprising magnesia, magnesium sulfate, and dolomite, and
a retarder,
wherein the lost circulation fluid is an invert emulsion, and
the external oil phase is a continuous phase.

17. The lost circulation fluid of claim 16, wherein the magnesia sealant is suspended in the external oil phase.

18. The lost circulation fluid of claim 16, wherein the retarder comprises sodium borate, boric acid, disodium tetraborate decahydrate, or a combination comprising at least one of the foregoing; and the retarder is present in an amount of about 0.1 weight percent to about 50 weight percent, with respect to the total weight of the magnesia sealant in the lost circulation fluid.

19. The lost circulation fluid of claim 16 wherein the emulsifier is present in an amount of about 0.1 weight percent to about 10 weight percent,
the wetting agent is present in an amount of about 0.01 weight percent to about 5 weight percent,
the magnesia sealant is present in amount of about 20 weight percent to about 80 weight percent, each based on a total weight of the lost circulation fluid, and
wherein the oil phase comprises an oil and the internal aqueous phase comprises water, a sea water, or a brine, and a volume ratio of the oil relative to water, the sea water, or the brine ranges from about 20:80 to about 80:20.

* * * * *